United States Patent
Cohen et al.

(10) Patent No.: US 6,904,799 B2
(45) Date of Patent: Jun. 14, 2005

(54) FLUID VELOCITY SENSOR WITH HEATED ELEMENT KEPT AT A DIFFERENTIAL TEMPERATURE ABOVE THE TEMPERATURE OF A FLUID

(75) Inventors: Adam J. Cohen, Worcester, MA (US); Josh E. Tang, Shirley, MA (US); Thomas R. Thibodeau, Acton, MA (US)

(73) Assignee: Polar Controls, Inc., Shirley, MA (US)

( * ) Notice: Subject to any disclaimer, the term of this patent is extended or adjusted under 35 U.S.C. 154(b) by 0 days.

(21) Appl. No.: 10/461,540

(22) Filed: Jun. 12, 2003

(65) Prior Publication Data

US 2004/0055374 A1 Mar. 25, 2004

Related U.S. Application Data

(60) Provisional application No. 60/387,789, filed on Jun. 12, 2002.

(51) Int. Cl.[7] ................................................. G01F 1/68
(52) U.S. Cl. .................................................... 73/204.11
(58) Field of Search ........................ 73/204.11, 204.15, 73/204.16, 204.17, 204.18, 204.19, 204.25

(56) References Cited

U.S. PATENT DOCUMENTS 6,470,741 B1 * 10/2002 Fathollahzadeh ........ 73/204.15

* cited by examiner

Primary Examiner—Edward Lefkowitz
Assistant Examiner—Corey D. Mack
(74) Attorney, Agent, or Firm—Stroock & Stroock & Lavan LLP (57) ABSTRACT

A system for measuring the velocity of a fluid can comprise a temperature sensor, for measuring the ambient temperature of the fluid, an RTD placed in the flow path of a fluid, the RTD being included as part of a Wheatstone bridge circuit, a digital potentiometer, the digital potentiometer also being included as part of a Wheatstone bridge circuit, and a controller coupled to the temperature sensor, the RTD and the digital potentiometer. In the system, the controller adjusts the digital potentiometer in response to an ambient fluid temperature signal from the temperature sensor such that the temperature of the RTD remains at a constant differential temperature above the ambient fluid temperature.

13 Claims, 6 Drawing Sheets

FLUID VELOCITY SENSOR WITH HEATED ELEMENT KEPT AT A DIFFERENTIAL TEMPERATURE ABOVE THE TEMPERATURE OF A FLUID

CROSS REFERENCE TO RELATED APPLICATIONS

This application claims the benefit of U.S. Provisional Application Ser. No. 60/387,789, entitled Constant Differential Temperature Mass Flow Sensor With a Variable Wheatstone Bridge Circuit, filed Jun. 12, 2002, the contents of which are incorporated herein by reference.

BACKGROUND OF THE INVENTION

1. Field of the Invention

The invention relates generally to the field of fluid velocity measurement and, more particularly, to a method and system for measuring the velocity of fluids by way of hot wire anemometry.

2. Description of Related Art

Many processes and devices make use of moving fluids. Some examples are heating and ventilating systems that make use of moving air, as well as manufacturing processes that rely on the use and flow of various gasses. Typically, for these processes and/or devices, it is important that the velocity of the fluid be accurately determined. Accordingly, various techniques to determine the velocity of a fluid have been developed.

One such technique is commonly referred to as hot wire anemometry. Generally, hot wire anemometry involves heating an object (or element) such as a temperature dependent resistor (e.g., thermistor or hotwire), to an elevated temperature, and placing the heated object in the path of a fluid flow and measuring the rate that energy is removed from the object by the fluid. Because the velocity of the fluid is an important component of the cooling effect of the flow, the velocity of the fluid can be determined mathematically once the rate of energy removal from the object is determined. As such, the amount of heat removed from the object due to the flow of the fluid is related to the fluid velocity and other parameters (such as the fluid temperature).

When implementing a system to measure fluid velocity via hot wire anemometry, there are three common methods for maintaining the elevated temperature of the heated object; constant current, constant temperature and constant differential temperature. The constant current method involves maintaining a constant current at the heated object, while the constant temperature method involves maintaining a constant temperature at the heated object. Consequently, both the constant current and constant resistance techniques rely upon the solving of relatively complex equations to determine the velocity of the fluid.

The constant differential temperature technique includes maintaining a constant temperature differential or difference between the heated object and some other temperature, such as the ambient temperature of the measured fluid.

An advantage of the constant temperature differential technique is that it completely removes the temperature variable from the velocity calculation, because only the temperature difference between the object (or element) and the fluid are significant. A disadvantage with this technique, however, is that it is typically relatively difficult and complicated to implement because the controlled (servo) parameter is neither resistance (as in the constant temperature approach) nor current (as in the constant current approach), but temperature, which needs to be converted to a measurable electrical quantity. Accordingly, an object (or element) may be used, such as a thermistor, or hot wire, wherein resistance (an electrically measurable quantity), varies in relation to temperature.

Typically, however, objects whose resistance varies as a function of temperature, such as thermistors and hot wires, have a temperature/resistance relationship that varies from sensor to sensor and is relatively non-linear, thus complicating the use of resistance as the measurable parameter. Accordingly, the use of constant temperature differential techniques for implementing hot wire anemometry is typically relatively cumbersome, prone to inaccuracies and inefficient. As such, a need exists for an improved method and system for measuring the velocity of fluids.

SUMMARY OF THE INVENTION

The present invention satisfies this need. Various embodiments of the present invention provide for a method and system for measuring the velocity of fluids.

In an embodiment of the invention, a system for measuring the velocity of a fluid can comprise a temperature sensor, for measuring the ambient temperature of the fluid, a thermistor placed in the flow path of a fluid, the thermistor being included as part of a Wheatstone bridge circuit, a digital potentiometer, the digital potentiometer also being included as part of a Wheatstone bridge circuit, and a controller coupled to the temperature sensor, the thermistor and the digital potentiometer. In the system, the controller adjusts the digital potentiometer in response to an ambient fluid temperature signal from the temperature sensor such that the temperature of the thermistor remains at a constant differential temperature above the ambient fluid temperature.

Other objects and features of the present invention will become apparent from the following detailed description, considered in conjunction with the accompanying system schematics and flow diagrams. It is understood, however, that the drawings are solely for the purpose of illustration and not as a definition of the limits of the invention, for which reference should be made to the appended claims.

BRIEF DESCRIPTION OF THE DRAWING FIGURES

In the drawing figures, which are merely illustrative, and wherein like reference numerals depict like elements throughout the several views.

DETAILED DESCRIPTION OF THE EXEMPLARY EMBODIMENTS

There will now be shown and described in connection with the attached drawing figures several exemplary embodiments of a method and system for measuring the velocity of fluids.

Figure 1:
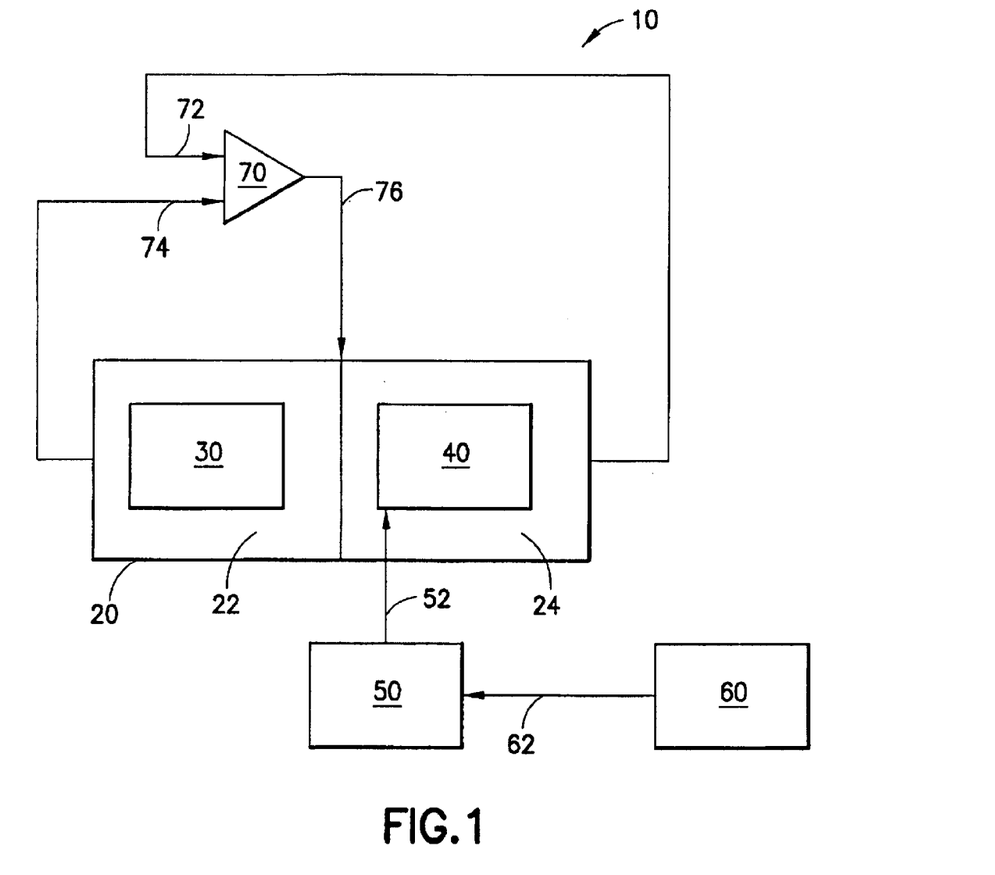
FIG. 1 is a schematic diagram of an overview of an exemplary embodiment of a system in accordance with the present invention.

With reference to FIG. 1, there is shown an exemplary overview of a system 10 for measuring the velocity of a fluid in accordance with the present invention. In general, in certain embodiments, a temperature sensor 60 measures the temperature of a fluid, and transmits the temperature data to controller (or microcontroller) 50. Controller 50 may be any type capable of performing the functions as described herein, as known to those skilled in the art, such as, for example, one supplied by Microchip as part number PIC1GF-76-04/50. The system is configured, by way of certain parameters stored at controller 50, such that element (or thermistor) 30 should be maintained at a certain temperature above that of the fluid, as measured by temperature sensor 60. As described herein, element 30 may be a thermistor or a hot wire, or may be any temperature measurement device generally referred to as a resistance temperature detector ("RTD"). The temperature of element 30 is related to the amount of current that passes through element 30, the current being generated at the output 76 of comparator (or op amp) 70. Element 30 is disposed on a first half 22 of Wheatstone bridge circuit 20. Because, in the illustrated configuration, comparator 70 facilitates balancing of Wheatstone bridge 20, the current passing through element 30, and thus the temperature of element 30, may be controlled and adjusted by varying digital potentiometer 40. In the present embodiment, digital potentiometer 40 may be controlled and adjusted by control signal 52 of controller 50.

Accordingly, in the present embodiment, a desired temperature difference between the fluid temperature as measured at temperature sensor 60, and element 30 is stored at controller 50. Also stored at controller 50 is the resistance—temperature relationship of element 30. Accordingly, controller 50 may continually receive the temperature of a fluid from temperature sensor 60, and calculate the desired temperature of element 30, which equals the temperature of the fluid plus the desired temperature difference. Controller 60 may also then calculate the desired temperature of element 30, and adjust the resistance of digital potentiometer 40. Accordingly, by this method, because the first section 20 and second section 24 of Wheatstone bridge circuit 20 are kept in balance by comparator 70, controller 50 can indirectly maintain the temperature of element 30 at a predetermined differential temperature, above the fluid temperature read by temperature sensor 60, by adjusting the resistance of digital potentiometer 40.

Figure 2:
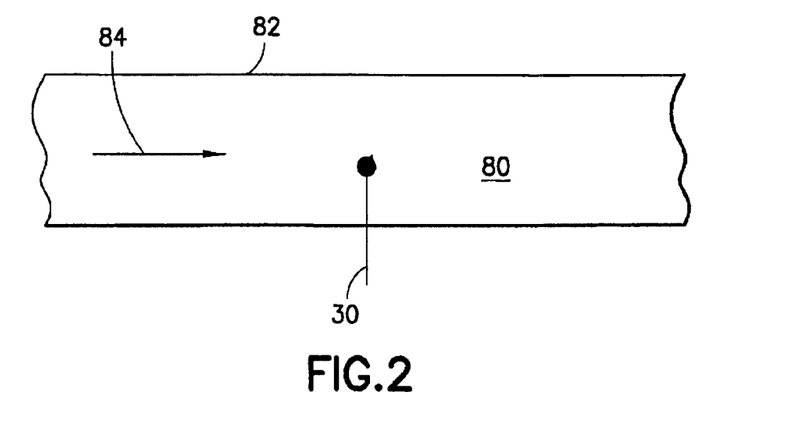
FIG. 2 is an exemplary schematic diagram of the placement of a thermistor in the flow path of a fluid in accordance with the present invention.

Turning to FIG. 2, there is shown a basic schematic diagram of an embodiment of the present invention in which element 30 is placed in the flow path 84 of fluid 80 within flow device 82.

Figure 3:
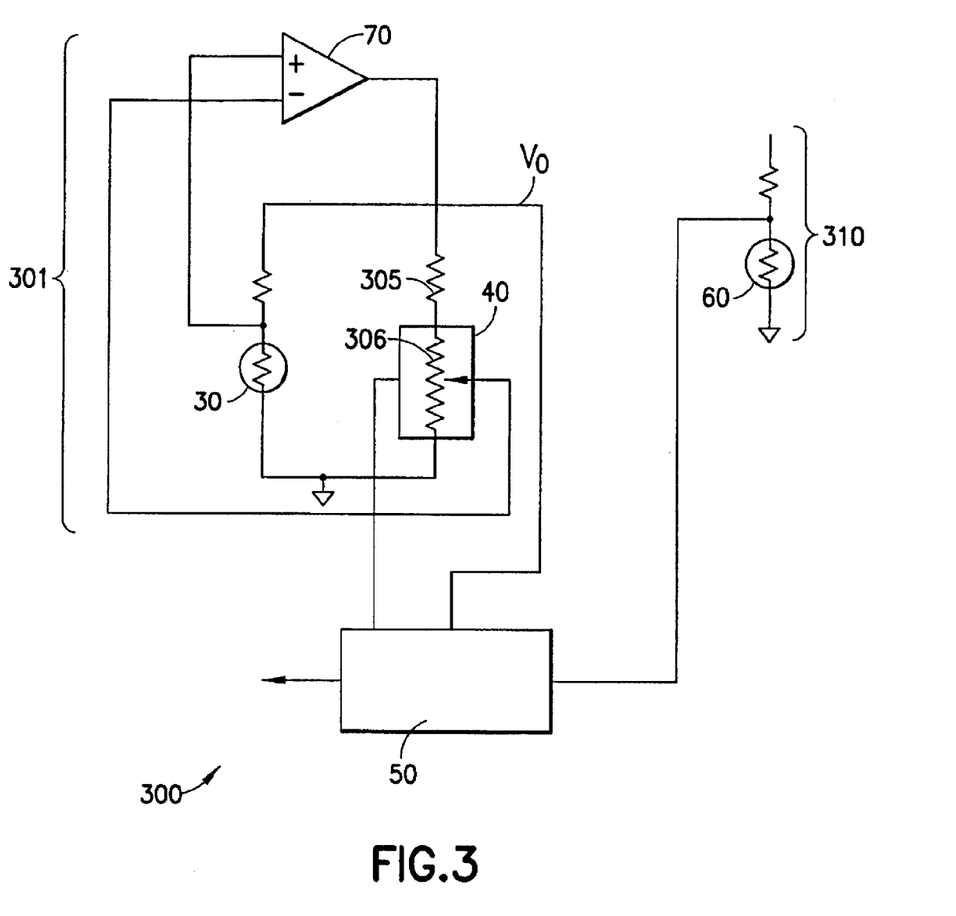
FIG. 3 is a schematic diagram of an exemplary embodiment of a system in accordance with the present invention.

In FIG. 3 an embodiment 300 of the present invention is illustrated in which element 30 is maintained at a constant differential temperature above that of the fluid. In the present embodiment, a Wheatstone bridge circuit is employed such that two resistor divider networks remain balanced 301. In the embodiment, one of the networks consists of the temperature dependent resistor 30 (i.e. thermistor, hot wire), while the other consists of two fixed resistors 305 and 306 whose ratio determines the operating resistance (temperature) of the thermistor 30. The comparator or op-amp 70 keeps the bridge balanced by adjusting the input voltage Vo to the bridge to keep the thermistor 30 at a constant resistance.

Changes in fluid velocity can change the amount of heat being removed from the thermistor 30. The Wheatstone bridge circuit precisely balances the electrical energy imparted to the heated element or thermistor 30 with the heat energy being removed by the flow of the fluid, as is known to those skilled in the art.

Figure 7:
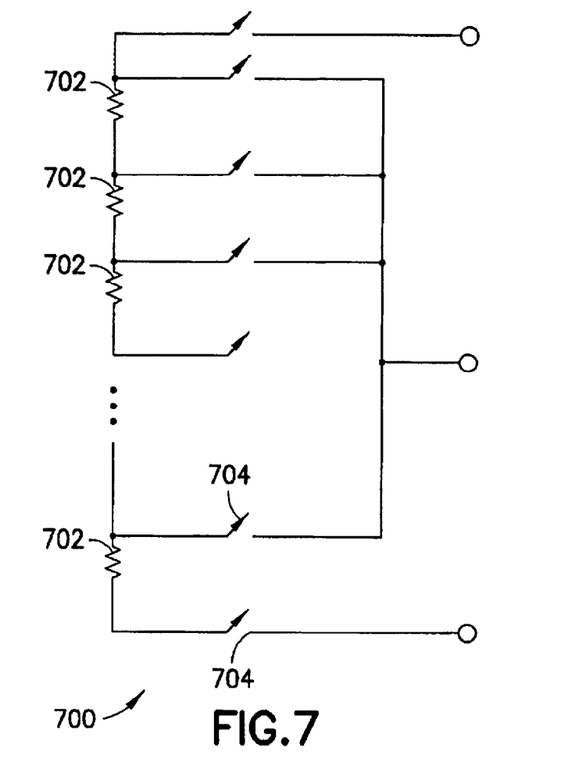
FIG. 7 is an exemplary schematic diagram of a digital potentiometer.

In the present embodiment, the reference leg of the Wheatstone bridge circuit 306 is provided with a digital potentiometer 40 that is controlled via a controller 50. The digital potentiometer 40 is used to adjust the servo resistance of the heated thermistor 30, thereby setting the operating temperature of thermistor 30 to a constant value above the ambient temperature of the fluid. With reference to FIG. 7, a digital potentiometer 700 generally comprises an array of switches 704 that can each selectively engage a respective resistor 702 into a circuit. A digital signal is provided to the digital potentiometer 700, corresponding to a desired resistance setting, and the digital potentiometer activates the appropriate switches 704 to engage the appropriate resistors 702 such that the correct resistance is achieved. Preferably, embodiments if the present invention employ a digital potentiometer that is commercially readily available, such as the digital potentiometer having part number AD5231 and provided by Analog Devices, Inc., of Norwood, Mass.

Turning again to FIG. 3, the temperature value is determined from the temperature of the fluid by a second temperature sensor 60, that is configured in a voltage divider circuit 310.

Controller 50 is used to calculate the desired operating temperature of the heated thermistor element 30 and make the proper adjustment of the digital potentiometer 40 to achieve the desired operating temperature of element 30.

The relationship between resistance and temperature of a thermistor, such as thermistor 30, or a hot wire is typically non-linear and non-uniform (from sensor to sensor). However, this relationship typically conforms to a model that gives accurate results based on several accurate calibration points 504, 506 (see FIG. 5).

Figure 5:
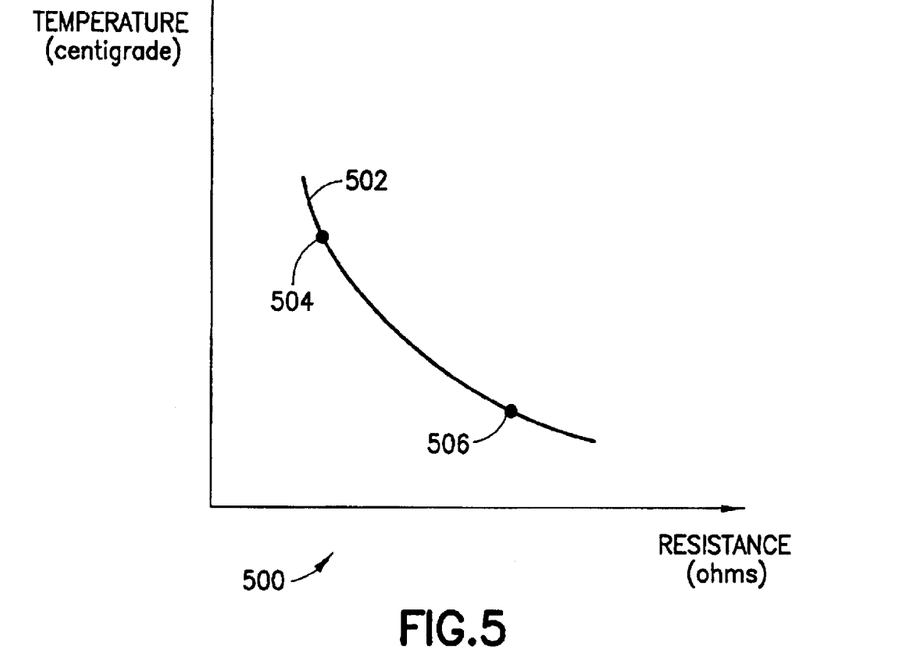
FIG. 5 is an exemplary temperature—resistance relationship in accordance with the present invention.

Preferably, in the present embodiment, thermistor 30 is a glass-encapsulated thermistor. Preferably, measurements are taken at two calibration points 504, 506 (see FIG. 5). More calibration points give a more accurate result, but at a higher expense. In a preferred embodiment, an oil bath is used to determine the calibration points to a precise value, which are then used to determine the unknowns in the temperature/resistance equation. The 3 parameter equations are:

$$1/T = b_0 + b_1[\ln RT] + b_3[\ln RT]^3$$

Where T=temperature in degree centigrade, R=resistance in ohms, and $b_0$, $b_1$, and $b_3$ are non-dimensional constants.

Figure 8:
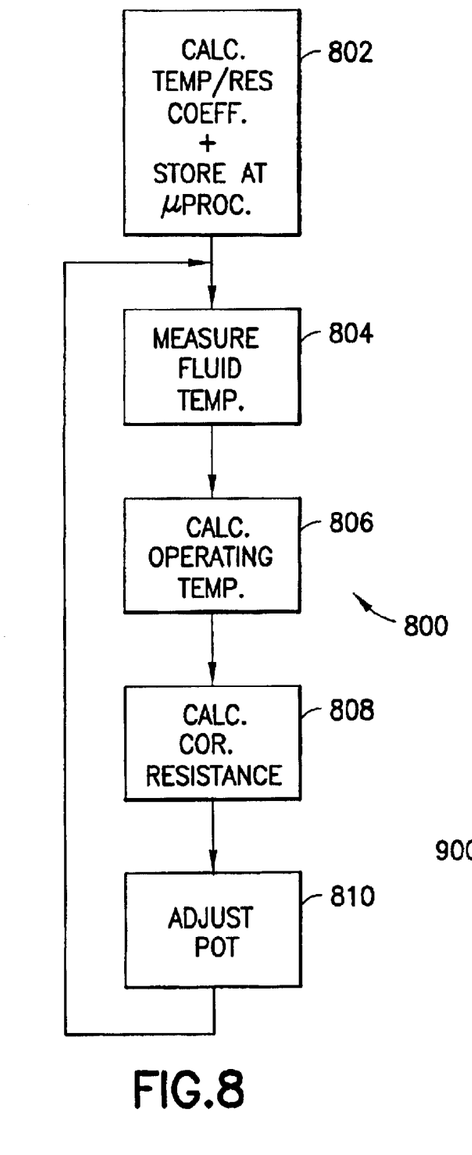
FIG. 8 is a flow diagram of an exemplary embodiment of a method of implementing a constant differential temperature algorithm in accordance with the present invention.

Turning to FIG. 8, there is shown an exemplary embodiment of a method 800 of maintaining the hot thermistor 30 at a constant temperature above the ambient temperature of the fluid, in accordance with the present invention. First, as described above, the temperature—resistance coefficient values of thermistor 30 are calculated by testing as several calibration points, and those values are stored at controller 50 (step 802). As also described above, temperature sensor 60 is coupled to controller 50 and measures the ambient temperature of the fluid (see FIG. 3) (step 804). The controller 50 internally adds the fluid temperature to the desired elevation in temperature to obtain the desired operating temperature of the heated thermistor 30 (step 806). The controller 50 then calculates the corresponding resistance of the heated thermistor 30 using the resistance/temperature expression of the thermistor 30 (step 808). The controller 50 then adjusts the digital potentiometer 40 to a value so that the Wheatstone bridge keeps the thermistor 30 at the desired temperature above ambient (step 810). This process is repeated continuously so that the heated element is always kept at a constant temperature above the ambient temperature of the fluid. Therefore, the use of a digital potentiometer in a differential temperature fluid velocity measurement system has some beneficial results.

The digital potentiometer 40, however, also has several limitations. One such limitation is that its resistance has a relatively high temperature dependence such that, in typical implementations, it may be unsuitable as a variable resistor in a Wheatstone bridge circuit. Certain embodiments of the present invention, however, advantageously employ the digital potentiometer 40 in a novel manner such that these limitations are minimized. Specifically, in certain embodiments, the digital potentiometer 40 is employed as a ratio-metric device, thus circumventing the relatively high temperature dependence, Preferably, the digital potentiometer 40 is formed with all the resistance elements on the same substrate, this giving each resistance element substantially the same temperature dependence. Accordingly, the digital potentiometer may be advantageously employed accurately as a ratio metric element, so that changes in the absolute resistance of the digital potentiometer have substantially no effect on the reference voltage divider leg of the Wheatstone bridge circuit.

Figure 4:
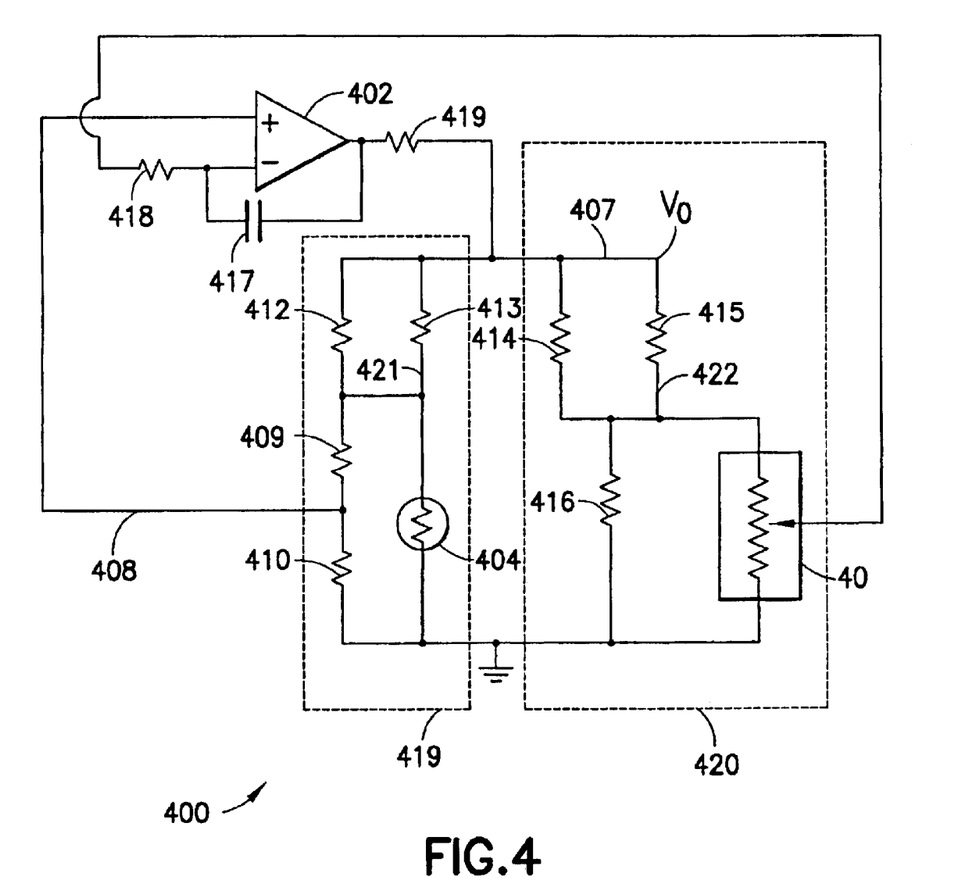
FIG. 4 is a schematic diagram of an exemplary embodiment of a system in accordance with the present invention.

Another deficiency typically associated with digital potentiometer 40 is its maximum voltage rating (typically five volts) which handicaps or limits the usable voltage range of the Wheatstone bridge. With reference to FIG. 4, there is shown how certain embodiments of the present invention advantageously level shift 408 the Wheatstone bridge voltage so that the digital potentiometer 40 never sees more than five volts, yet allows higher voltages to be applied to the Wheatstone bridge 407. This process of level shifting is now described in further detail with continued reference to FIG. 4.

A typical commercially available digital potentiometer 40 has a maximum operating voltage of five volts. Furthermore, the absolute resistance of the digital potentiometer 40 is typically relatively poorly controlled and has a high dependence on temperature. Both of these constraints are accounted for in the Wheatstone bridge circuit. The function of the Wheatstone bridge circuit, as is known to those skilled in the art, is to keep voltages 421 and 422 equal. This is equivalent to keeping the ratio of the top to bottom resistors of both legs of the Wheatstone bridge equal. This, in turn, keeps thermistor 404 at a constant resistance and therefore at a constant temperature. Level shifting the voltage down to allow inclusion of a digital potentiometer is accomplished as follows. The leg of the Wheatstone bridge containing the thermistor 404 includes a fixed resistor 413 and the thermistor 404. The thermistor voltage is level shifted down by voltage divider network resistors 409 and 410. This voltage is used as the input to the positive terminal of comparator or op-amp 402. The reference leg of the Wheatstone bridge 420 is level shifted down by resistors 414 and 416 and is used for the input voltage to the digital potentiometer 40. Level shift resistors 414 and 416 are preferably over 10 times smaller in resistance value than the resistance of digital potentiometer 40. Accordingly, changes in the absolute resistance of digital potentiometer 40 have a minimal effect on the output (it is also possible to buffer voltage 422 before entering the digital potentiometer 40). The sum of voltage divider resistors 409 and 410 are preferably chosen to equal the value of the resistance of digital potentiometer 40. Accordingly, in this manner, the voltage is level shifted down such that a typical digital potentiometer with a five volt maximum range may be beneficially employed.

Once the heated element is kept at a constant temperature above the ambient temperature of the fluid, the calibration process is greatly simplified. The air velocity depends on a single variable, in this case the voltage 407. Temperature is taken completely out of the equation. Thus, the equation is reduced to a single variable and can be approximated by a polynomial taken to any number of terms:

Velocity=$a_0 + a_1 *V + a_2 *V^2/2! + a_3 *V^3/3! + \ldots$

Where V=voltage in volts, and $a_0$, $a_1$, $a_2$ and $a_3$ are non-dimensional constants.

Figure 6:
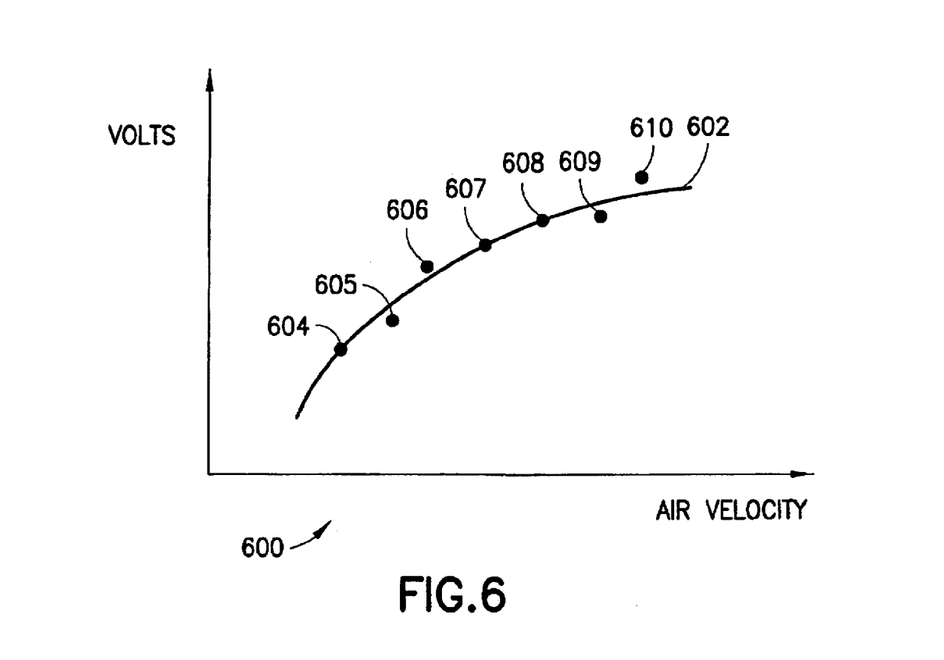
FIG. 6 is an exemplary voltage—fluid velocity relationship in accordance with the present invention.
Figure 9:
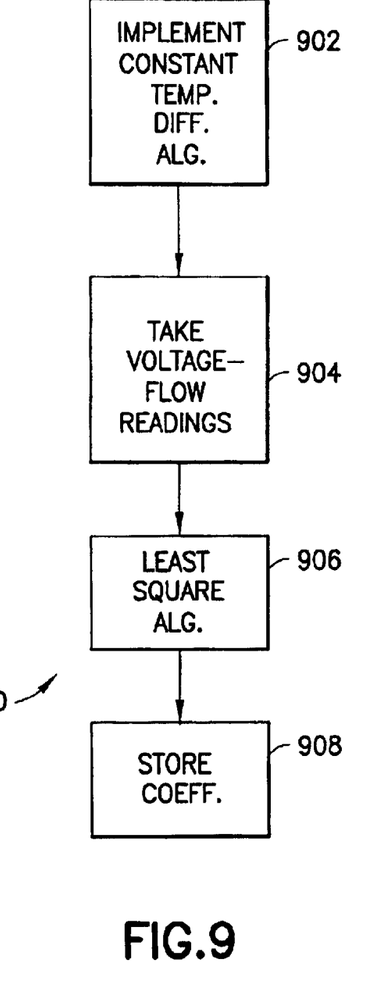
FIG. 9 is a flow diagram of an exemplary embodiment of a method of calibrating a voltage—fluid velocity relationship in accordance with the present invention.

With reference to FIG. 9, an exemplary calibration process 900 is shown and described. First, as described above, and as illustrated in FIG. 8, two or more temperature calibration points are obtained for the heated thermistor 30, the temperature—resistance coefficients are calculated for thermistor 30, and the coefficients are stored at the controller. Subsequently, the routine that keeps the thermistor 30 at a constant temperature above the ambient temperature of the fluid is implemented (step 902). Next, the system is calibrated by placing the heated element in a wind tunnel and taking several voltage readings 604, 605, 606, 607, etc. (see FIG. 6) at different fluid flow rates while the system continues to employ the temperature—resistance equation to maintain a heated thermistor 30 element at a constant temperature above the ambient temperature of the fluid (step 904). Next, the controller performs a least square calculation on the acquired data to derive coefficients for a mathematical expression for the velocity of the fluid. This calculation, as is known to those skilled in the art, may employ King's law, polynomial theory, or similar calculation methods. Next, the calculated coefficients are stored at the controller, and the calibration process is complete (step 908).

Figure 10:
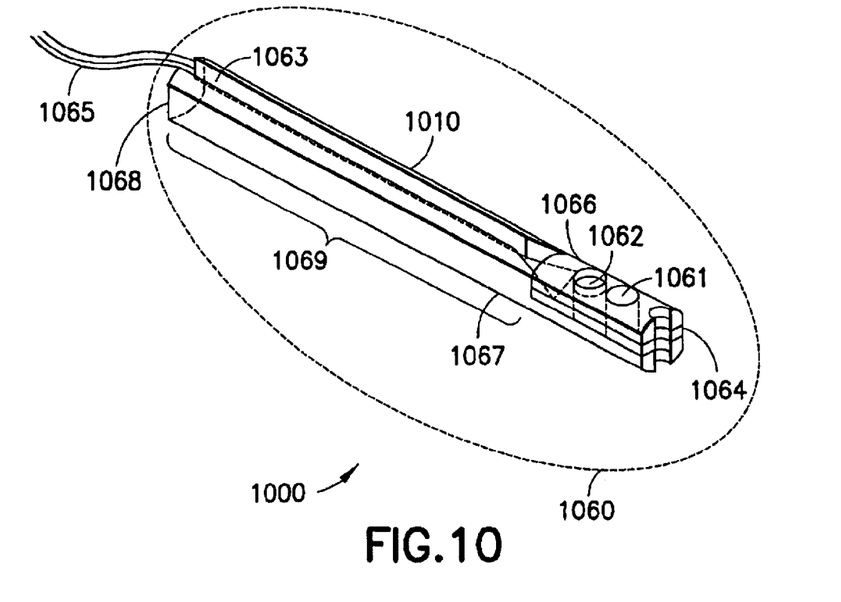
FIG. 10 is a perspective view of an exemplary embodiment of a probe made in accordance with the present invention.

Turning to FIG. 10, there is shown a fluid flow sensor 1000 in accordance with an embodiment of the present invention. The heated and cold elements are mounted to a printed circuit board 1064, which is attached via a 3-conductor ribbon cable 1065 to the sensor electronics. The PC board assembly is preferably disposed between two plastic parts 1066, 1067 that are formed to protect the elements, strain relieve the wires, facilitate mounting and manufacturing, and to provide an aerodynamic face to the flow. A single screw 1062 can be used to secure the two plastic pieces and the circuit board. Plastic part 1067 is slotted to provide a channel for the connecting wire 1065.

The hot wire element is suspended in the center of a channel 1061, providing protection from accidental contact. The plastic body 1010 is formed to provide strain relief to the wires when secured with the screw. The shape of the probe incorporates flat sides 1068 to facilitate mounting and provide proper orientation. The handle of the probe 1069 is designed to give the user control of the probe insertion length into airflow. The handle can be cut to the desired length without affecting the calibration of the unit. The handle also includes a slot 1063 running down the entire length to assist in cable management.

The probe is designed with both the front and the back having a rounded profile, while the sides are flat. While the flat sides assist in mounting, they also serve an important function in the aerodynamics of the probe. The rounded front and rear provide a clean face towards the airflow, and the flats provide a reduction in separation affects of the air passing over the probe, thus minimizing the impedance of the sensor in the flow.

While the invention has been described in connection with preferred embodiments, it will be understood that modifications thereof within the principles outlined above will be evident to those skilled in the art and thus, the invention is not limited to the preferred embodiments but is intended to encompass such modifications.

What is claimed:

1. A system for measuring the velocity of a fluid, the system comprising:
    a temperature sensor, for measuring the ambient temperature of the fluid;
    an RTD placed in the flow path of the fluid;
    a digital potentiometer, and
    a controller coupled to the temperature sensor, the RTD and the digital potentiometer;
    wherein the controller adjusts the digital potentiometer in response to an ambient fluid temperature signal from the temperature sensor the RTD is heated to a temperature higher than the ambient fluid temperature; and, the difference between the temperature of the RTD and the ambient temperature of the fluid remains substantially constant.

2. The system of claim 1, further comprising a Wheatstone bridge circuit.

3. The system of claim 1, wherein the RTD is disposed in a first branch of a Wheatstone bridge circuit, and the digital potentiometer is disposed in a second branch of the Wheatstone bridge circuit.

4. The system of claim 3, wherein a comparator is used to balance the Wheatstone bridge circuit.

5. The system of claim 4, wherein the comparator is an op-amp.

6. The system of claim 3, wherein the temperature of the RTD is greater than the ambient temperature of the fluid.

7. The system of claim 1, wherein the digital potentiometer is employed as a ratio metric element.

8. The system of claim 1, wherein the Wheatstone bridge circuit is level shifted.

9. The system of claim 1, wherein the RTD is a thermistor.

10. The system of claim 1, wherein the RTD is a hot wire.

11. The system of claim 1, wherein a calculation to determine the velocity of the fluid is performed, and wherein said calculation is independent of the ambient temperature of the fluid.

12. A method for measuring the velocity of a fluid, the method comprising:
    measuring the ambient temperature of the fluid with a temperature sensor;
    placing an RTD in the flow path of the fluid; and
    adjusting with a controller a digital potentiometer in response to an ambient fluid temperature signal from the temperature sensor wherein the RTD is heated to a temperature higher than the ambient fluid temperature; and, the difference between the temperature of the RTD and the ambient temperature of the fluid remains substantially constant.

13. The method of claim 12, wherein the RTD is disposed in a first branch of a Wheatstone bridge circuit, and the digital potentiometer is disposed in a second branch of the Wheatstone bridge circuit.

* * * * *